US012459441B1

(12) United States Patent
Di Piazza

(10) Patent No.: US 12,459,441 B1
(45) Date of Patent: Nov. 4, 2025

(54) UNIVERSAL LADDER STRAP SYSTEM

(71) Applicant: Salvatore Domenico Di Piazza, La Crescenta, CA (US)

(72) Inventor: Salvatore Domenico Di Piazza, La Crescenta, CA (US)

( * ) Notice: Subject to any disclaimer, the term of this patent is extended or adjusted under 35 U.S.C. 154(b) by 132 days.

(21) Appl. No.: 18/369,259

(22) Filed: Sep. 18, 2023

Related U.S. Application Data

(60) Provisional application No. 63/416,367, filed on Oct. 14, 2022.

(51) Int. Cl.
*B60R 9/048* (2006.01)

(52) U.S. Cl.
CPC .................... *B60R 9/0485* (2013.01)

(58) Field of Classification Search
CPC .............................. B60R 9/0485; B60R 9/0423
See application file for complete search history.

(56) References Cited

U.S. PATENT DOCUMENTS

| 3,877,624 | A | * | 4/1975 | Carson | B60R 9/0485 224/570 |
| 4,339,064 | A | * | 7/1982 | Ziaylek, Jr. | A62C 33/00 211/60.1 |
| 5,154,258 | A | * | 10/1992 | Krukow | B60R 9/0485 248/316.4 |
| 2005/0098595 | A1 | * | 5/2005 | Smith | B60R 9/0485 224/319 |
| 2005/0128442 | A1 | * | 6/2005 | Huff | B60R 9/0485 353/119 |
| 2008/0203695 | A1 | * | 8/2008 | Bell | B60R 9/0485 280/154 |
| 2016/0325690 | A1 | * | 11/2016 | Hosler | B60R 9/0485 |
| 2018/0186298 | A1 | * | 7/2018 | Parker | B60R 9/0485 |

* cited by examiner

*Primary Examiner* — Derek J Battisti
(74) *Attorney, Agent, or Firm* — Plager Schack LLP; Mark H. Plager; Kara K. Verryt

(57) ABSTRACT

A device for safely, efficiently, and easily securing a ladder to a ladder rack frame on a vehicle may include a mounting body configured to removably secure to the ladder rack frame; and a spring-loaded latch rod slidably and rotatably engaged with the mounting body such that the latch rod is configured to slide from a first, relaxed position to a second, extended position. The spring-loaded latch rod may include a guide leg with a proximal end and a distal end and a leg hold extending substantially perpendicularly from the proximal end of the guide leg, wherein a distal end of the leg hold has a hooked end, such that, when the latch rod is in its first, relaxed position, the leg hold is configured to securely hold the ladder against the ladder rack frame.

10 Claims, 4 Drawing Sheets

UNIVERSAL LADDER STRAP SYSTEM

RELATED APPLICATION

This application claims priority to provisional patent application U.S. Ser. No. 63/416,367 filed on Oct. 14, 2022, the entire contents of which is herein incorporated by reference.

BACKGROUND

The embodiments described herein relate generally to tools and, more particularly, to a universal ladder strap system to strap a ladder to, for example, a rack on a truck.

It can be difficult to efficiently and safely secure a ladder to a ladder rack on a truck. When ladders are not properly strapped or secured to the ladder rack, a ladder can unintentionally fall from the rack, causing a dangerous situation. Existing options to strap a ladder to a ladder rack have multiple moving parts and require two hands to strap the ladder to the rack. Sometimes individuals will use a bungee cord or other similar strapping device, which can break or fall apart.

Therefore, what is needed is a device for easily, efficiently, and safely securing a ladder to a ladder rack.

SUMMARY

Some embodiments of the present disclosure include a device for safely, efficiently, and easily securing a ladder to a ladder rack frame on a vehicle. The device may include a mounting body configured to removably secure to the ladder rack frame; and a spring-loaded latch rod slidably and rotatably engaged with the mounting body such that the latch rod is configured to slide from a first, relaxed position to a second, extended position. The spring-loaded latch rod may include a guide leg with a proximal end and a distal end and a leg hold extending substantially perpendicularly from the proximal end of the guide leg, wherein a distal end of the leg hold has a hooked end, such that, when the latch rod is in its first, relaxed position, the leg hold is configured to securely hold the ladder against the ladder rack frame.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a device for safely, efficiently, and easily securing a ladder to a ladder rack and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

Figure 1:
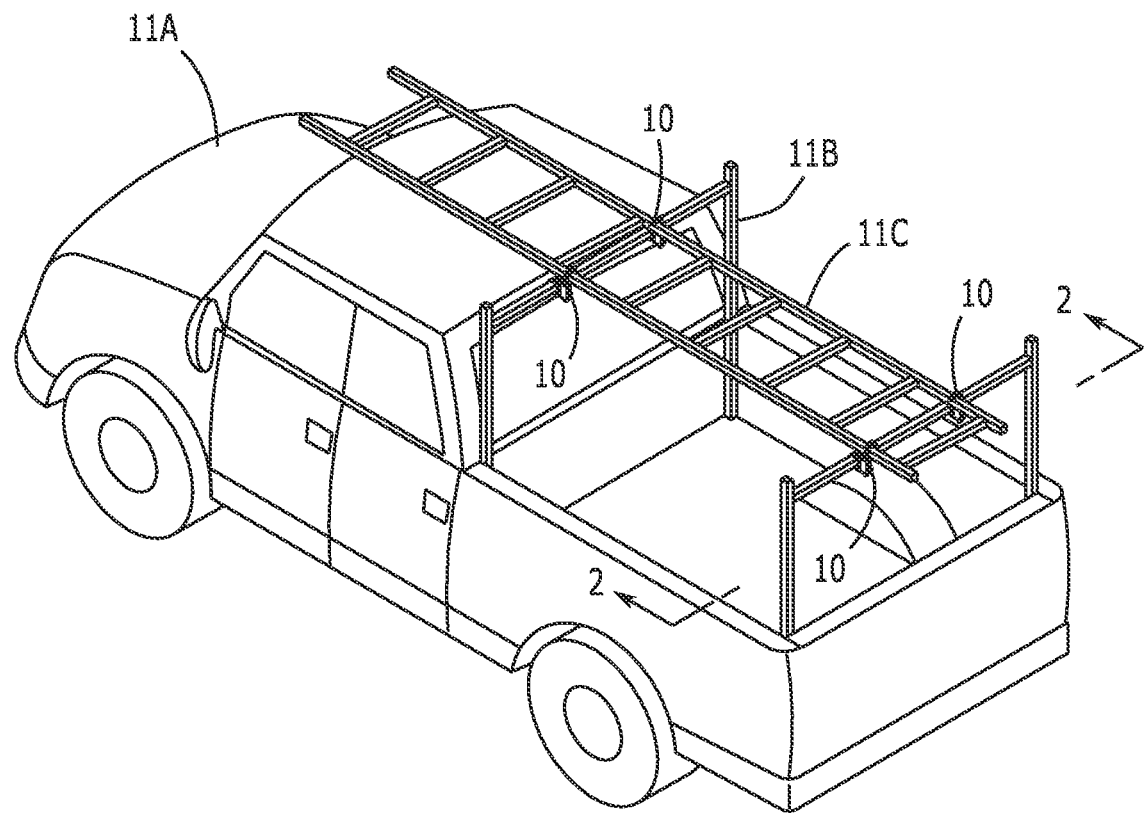
FIG. 1 is a top perspective view of one embodiment of the present disclosure.
Figure 2:
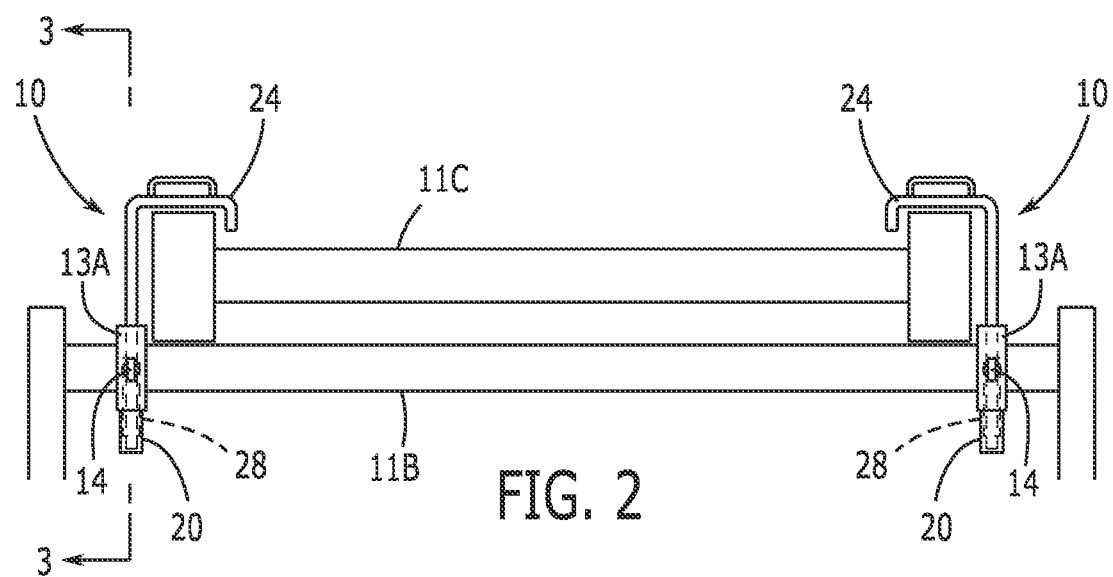
FIG. 2 is a cross-sectional view of one embodiment of the present disclosure, taken along line 2-2 of FIG. 1.
Figure 3:
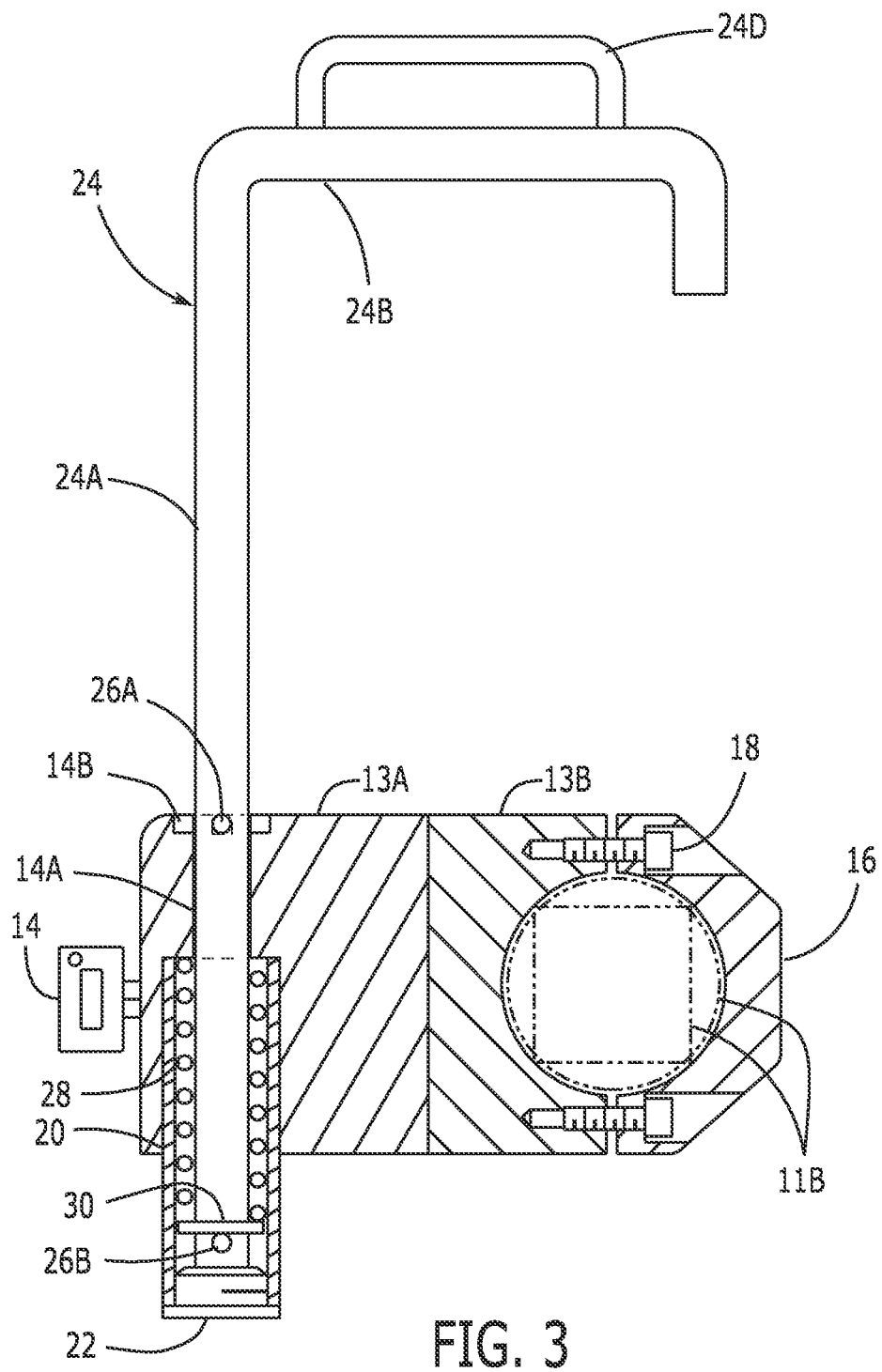
FIG. 3 is a cross-sectional view of one embodiment of the present disclosure, taken along line 3-3 in FIG. 1.
Figure 4:
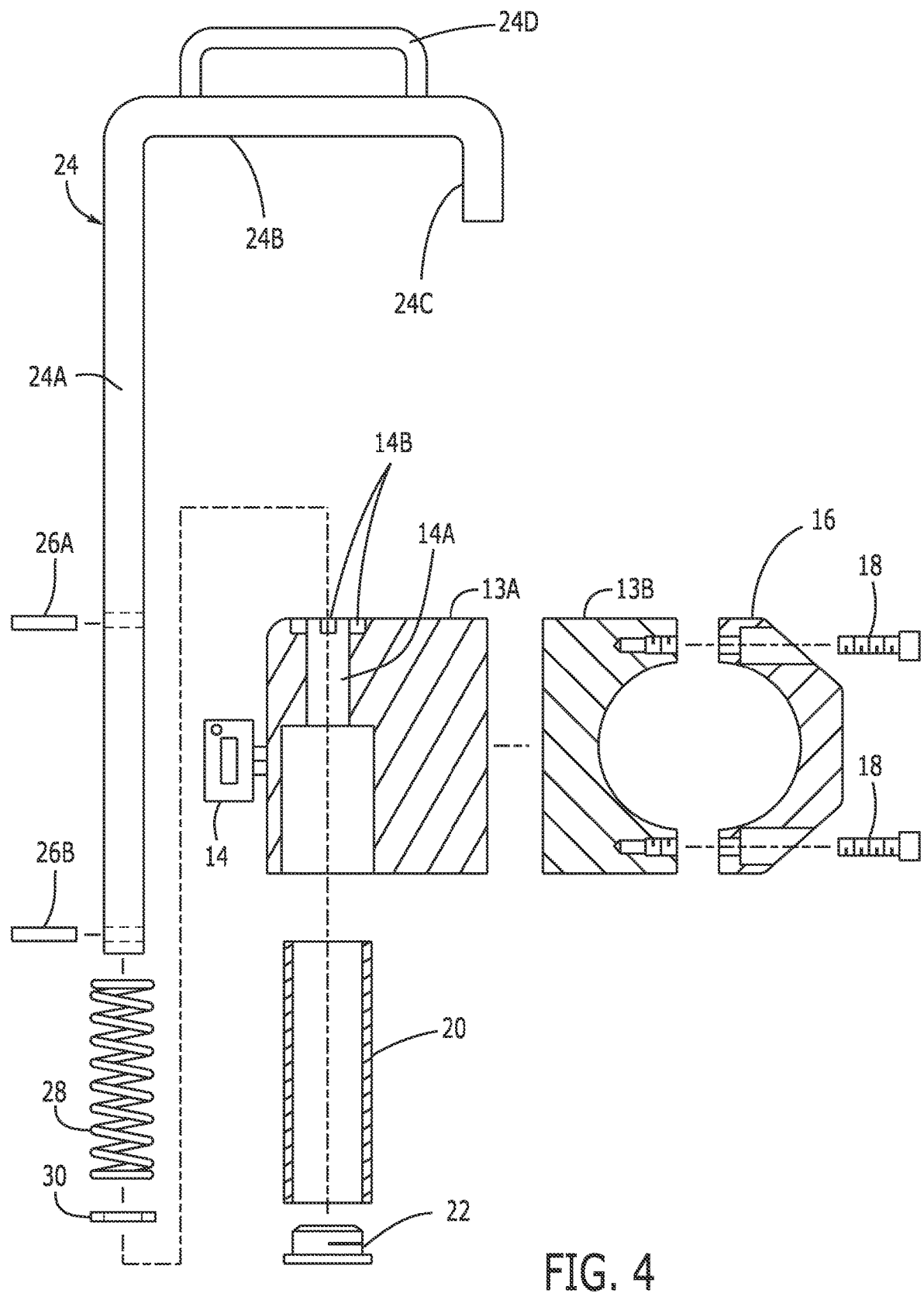
FIG. 4 is an exploded elevational view of one embodiment of the present disclosure, with parts shown in cross-section.
Figure 5A:
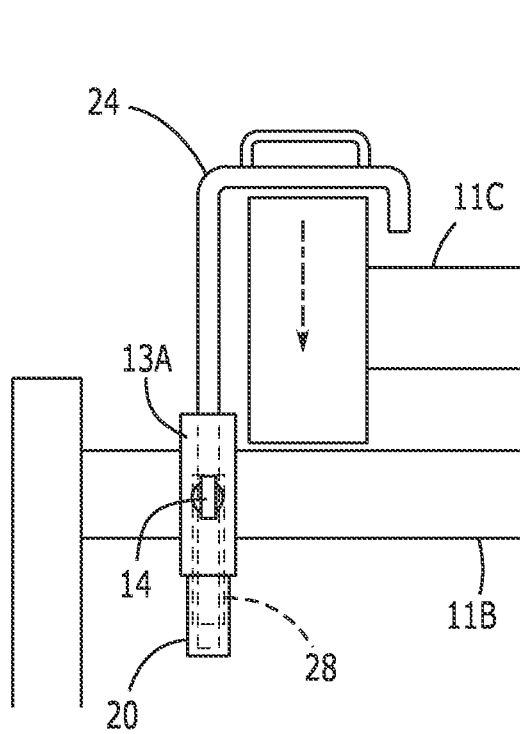
FIG. 5A-5C are perspective views of one embodiment of the present disclosure, showing the steps of unlatching a ladder.
Figure 5B:
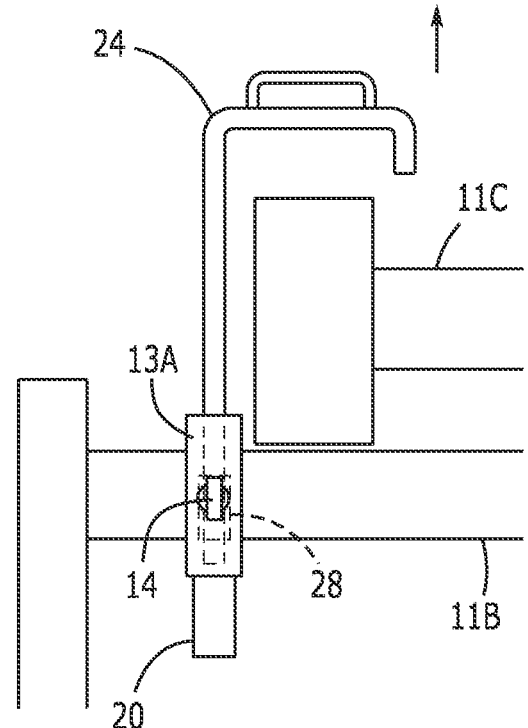
Figure 5C:
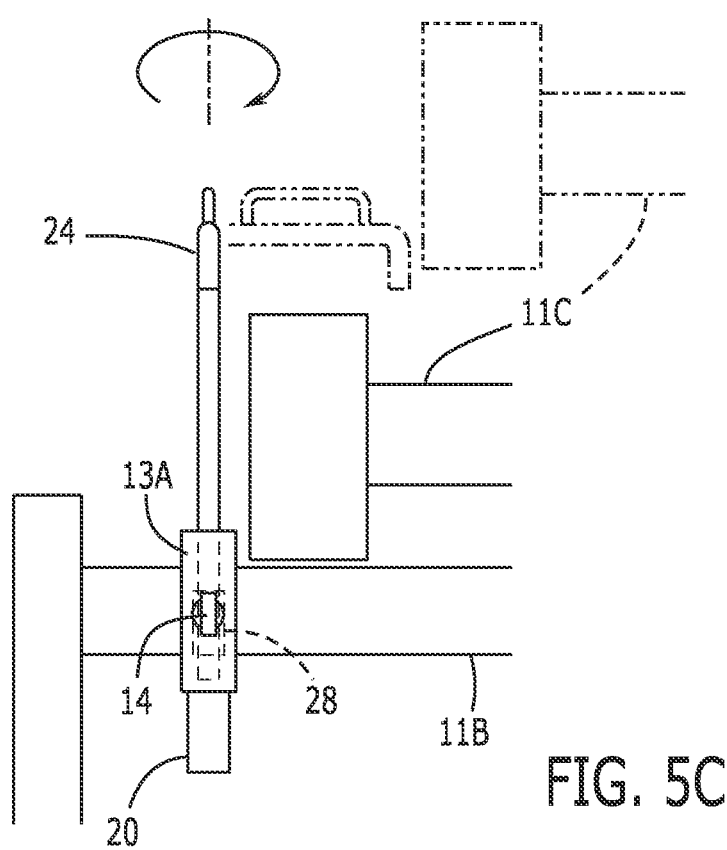

By way of example, and referring to FIGS. 1-5C, some embodiments of the present disclosure include a device 10 for safely, efficiently, and easily securing a ladder 11C to a ladder rack frame 11B, such as to a ladder rack frame 11B on a vehicle 11A, the device 10 comprising a mounting body configured to removably secure to the ladder rack frame 11B; and a latch rod 24, such as a spring-loaded latch rod, slidably and rotatably engaged with the mounting body such that the latch rod 24 is configured to slide from a first, relaxed position to a second, extended position, the latch rod 24 comprising a guide leg 24A with a proximal end and a distal end, and a leg hold 24B extending substantially perpendicularly from the proximal end of the guide leg 24A, wherein a distal end of the leg hold 24B comprises a hooked end, such that, when the latch rod 24 is in its first, relaxed position, it is configured to securely hold the ladder 11C against the ladder rack frame 11B, as shown in FIG. 5A. On the other hand, when the latch rod 24 is in its second, extended position, the leg hold 24B is spaced away from the ladder 11C, as shown in FIG. 5B. When the leg hold 24B is in its second, extended position and rotated, the leg hold 24B is no longer aligned with the ladder 11C, thus allowing it to be removed from the ladder rack frame 11B, as shown in FIG. 5C. As shown in the Figures, the leg hold 24B may be positioned vertically above the mounting body, regardless of orientation of the guide leg 24A, meaning that the leg hold 24B and the top surface of the mounting body may be spaced apart by a distance no larger than a depth of a ladder 11C leg when the latch rod 24 is in its first, relaxed position.

More specifically, and as shown in FIGS. 3 and 4, the mounting body may comprise a first half 13A and a second half 13B, wherein the first half 13A includes an latch rod channel 14A extending therethrough, the latch rod channel 14A sized to accommodate slidable insertion of the latch rod 14 therein. The second half 13B may comprise a first semicircular cutout in a side edge thereof with a fastener orifice positioned on either side of the semicircular cutout. The first half 13A and the second half 13B may be two structurally distinct parts of the mounting body that may be operatively attached to one other or, on other embodiments, the mounting body may be a single solid unit, wherein the first half 13A is simply one side of the mounting body and the second half 13B is simply the opposite side of the mounting body. A clamp 16, including a second semicircular cutout in a side surface thereof may be removably engaged with the second half 13B using a plurality of fasteners 18, such as screws, extending through the clamp 16 and into the second half 14B, such that the first semicircular cutout and the second semicircular cutout are aligned to create an circular orifice sized to be positioned around the ladder frame 11B. Thus, by positioning the second half 13B adjacent to one side of the ladder rack frame 11B and positioning the clamp 16 on the opposite side of the ladder rack frame 11B and securing the clamp 16 to the second half 13B, the mounting body may be secured to the ladder rack frame 11B. While the cutouts are shown and described as being semicircular in shape, it is understood that other shaped cutouts, such as square, oval, or the like, are envisioned and would be suitable for securing the mounting body to the ladder frame 11B.

As mentioned above and as shown in the Figures, a latch rod channel 14A may extend through the first half 13A of the mounting body. A bottom of the latch rod channel 14A may ultimately be blocked by a cap 22, wherein the guide leg 24A of the latch rod 24 is slidably positioned within the latch rod channel 14A. A washer 30 may be secured around a bottom end of the guide leg 24A, wherein an attachment pin 26B may extend through and outward from the guide leg 24A between the washer 30 and the bottom end of the guide leg 24A to prevent the washer 30 from being unintentionally removed from the guide leg 24A. A spring 28 may encircle the guide leg 24A, wherein the spring 28 is positioned adjacent to a top surface of the washer 30, such that the washer 30 prevents the spring 28 from sliding off a bottom end of the guide leg 24A. As shown in the Figures, a bottom portion of the latch rod channel 14A may have a larger diameter than a top portion of the latch rod channel 14A, such that the spring 28 fits within the bottom portion of the latch rod channel 14A but has too large of a diameter to fit within the top portion of the latch rod channel 14A. Thus, the step from the larger diameter to the smaller diameter of the latch rod channel 14A may function as a stop for the top end of the spring 28.

In some embodiments, and as shown in the Figures, a guide tube 20 may be inserted into and extend outward from the bottom portion of the latch rod channel 14A. The cap 22 may be securely attached to the bottom end of the guide tube 20. As shown in FIGS. 3 and 4, the bottom portion of the guide leg 24A, the spring 28, the washer 30, and the attachment pin 26B may be slidably positioned within the guide tube 20. In embodiments, when the latch rod 24 is pulled upward from the mounting body, the spring 28 may compress within the guide tube 20 and, when released, the spring 28 may force the latch rod 24 back downward into the guide tube 20 and mounting body.

As shown in FIG. 3, a top edge of the latch rod channel 14A may have an alignment slot 14B extending outward therefrom, wherein the alignment slot 14B is sized to accommodate placement of an alignment pin 26A therein. More specifically as shown in FIG. 4, the mounting body may comprise a pair of perpendicular alignment slots 14B positioned at the top edge of the latch rod channel 14A, wherein a first of the alignment slots 14B may be substantially parallel to a length of the ladder 11C and a second of the alignment slots 14B may be substantially perpendicular to a length of the ladder 11C when the ladder 11C is positioned on the ladder rack frame 11B. As shown in the Figures, an alignment pin 26A may extend outward from the latch rod 24 proximal to the opening of the latch rod channel 14A when the spring 20 is in its relaxed state. The alignment pin 26A may be positioned to be aligned with and nested within the alignment slots 14B when the latch rod 24 is in its first, relaxed position. The interaction of the alignment pin 26A and the alignment slot 14B may function to prevent the latch rod 24 from unintentionally rotating when in the first, relaxed position. In embodiments, when the alignment pin 26A is positioned within a first of the alignment slots 14B, the latch rod 24 may be positioned such that the leg hold 24B extends outward over the ladder 11C, as shown in FIG. 5A and, when the alignment pin 26A is positioned within a second of the alignment slots 14B, the latch rod 24 may be positioned such that the leg hold 24B is parallel to the elongate length of the ladder 11C, as shown in FIG. 5C.

In some embodiments, the latch rod 24 may further comprise a handle 24D extending upward from a top surface of the leg hold 24B. The handle 24D may provide for an easy gripping structure for a user to adjust the positioning of the latch rod 24. While the Figures show the handle 24D simply being an inverted and squared-off U-shape protrusion, the use of other handle designs is envisioned.

In yet further embodiments, the mounting body may further comprise a guide leg lock 14 extending outward from a side of the mounting body, such as the side opposite the clamp 16. The guide leg lock 14 may comprise a locking mechanism configured to secure the latch rod 24 in its desired position and to prevent it from sliding into or out of the latch rod channel 14A in the mounting body.

The device 10 of the present disclosure may have any desired dimensions that allow it to engage with a ladder rack frame 11B on a vehicle 11A and with a ladder 11C, as described. The components may be made of any suitable materials, such as rigid materials like metal or plastic.

To use the device 10 of the present disclosure, the user may first secure the mounting body to the ladder rack frame 11B by securing the clamp 16 to the second half 13B of the mounting body around the ladder rack frame 11B. The latch rod 24 may then be pulled up and rotated such that the leg hold 24B is parallel to the elongate length of the vehicle (and perpendicular to the cross bar on the ladder rack frame 11B). A ladder 11C may then be placed on the ladder rack frame 11B such that a leg of the ladder 11C is positioned adjacent to the mounting body. The latch rod 24 may then be pulled up and rotated such that the leg hold 24B is perpendicular to and pressing down on the leg of the ladder 11C. The guide leg lock 14 may then be used to secure the latch rod in the ladder securing position. To remove the ladder 11C, the steps may simply be reversed.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A device for safely, efficiently, and easily securing a ladder to a ladder rack frame on a vehicle, the device comprising: a mounting body configured to removably secure to the ladder rack frame, wherein the mounting body is a solid member with a latch rod channel extending therethrough; a cap blocking and closing off a bottom end of the latch rod channel; and a spring-loaded latch rod slidably and rotatably engaged with the mounting body such that the latch rod is configured to slide from a first, relaxed position to a second, extended position, the spring-loaded latch rod comprising: a guide leg with a proximal end and a distal end; and a leg hold extending substantially perpendicularly from the proximal end of the guide leg, wherein a distal end of the leg hold comprises a hooked end, such that, when the latch rod is in its first, relaxed position, the leg hold is configured to hold the ladder against the ladder rack frame; and a clamp removably engaged with the mounting bracket, wherein: the mounting bracket and the clamp together define an orifice sized to accommodate positioning of the ladder rack frame therein.

2. The device of claim 1, wherein:
the mounting body comprises a first half and a second half;
the first half includes the latch rod channel extending therethrough, the latch rod channel being sized to accommodate slidable insertion of a bottom portion of the guide leg therein; and
the second half is removably attached to the clamp using a plurality of fasteners.

3. The device of claim 2, wherein
the second half comprises a first semicircular cutout in a side edge thereof with a fastener orifice positioned on either side of the semicircular cutout; and
the clamp comprises a second semicircular cutout in a side surface thereof, the second semicircular cutout positioned to align with the first semicircular cutout when the clamp is attached to the second half, thus forming the orifice.

4. The device of claim 1, wherein:
the guide leg is slidably positioned within the latch rod channel;
a washer is secured around a bottom end of the guide leg; and
a spring encircles a bottom portion of the guide leg, wherein the spring is positioned adjacent to a top surface of the washer.

5. The device of claim 4, wherein:
a bottom portion of the latch rod channel has a larger diameter than a top portion of the latch rod channel, such that the spring fits within the bottom portion of the latch rod channel; and
a step between the bottom portion of the latch rod channel and the top portion of the latch rod defines a stop for a top end of the spring.

6. The device of claim 5, further comprising a guide tube positioned within the bottom portion of the latch rod channel,
wherein the guide leg, the spring, and the washer are slidably positioned within the guide tube.

7. The device of claim 4, further comprising:
an alignment pin extending through the guide leg; and
a pair of alignment slots extending from a top edge of the latch rod channel, the pair of alignment slots each sized to accommodate placement of the alignment pin therein.

8. The device of claim 4, further comprising a guide leg lock operatively attached to the mounting body and operatively engaged with the guide leg, wherein the guide leg lock is configured to prevent rotation of the guide leg within the guide leg channel.

9. The device of claim 1, further comprising a handle attached to the leg hold.

10. A device for safely, efficiently, and easily securing a ladder to a ladder rack frame on a vehicle, the device comprising:
a mounting body configured to removably secure to the ladder rack frame;
a cap blocking a bottom end of the latch rod channel;
a clamp removably engaged with the mounting bracket, wherein the mounting bracket and the clamp together define an orifice sized to accommodate positioning of the ladder rack frame therein; and
a spring-loaded latch rod slidably and rotatably engaged with the mounting body such that the latch rod is configured to slide from a first, relaxed position to a second, extended position, the spring-loaded latch rod comprising:
a guide leg with a proximal end and a distal end; and
a leg hold extending substantially perpendicularly from the proximal end of the guide leg,
wherein:
a distal end of the leg hold comprises a hooked end, such that, when the latch rod is in its first, relaxed position, the leg hold is configured to hold the ladder against the ladder rack frame;
the guide leg is slidably positioned within the latch rod channel;
a washer is secured around a bottom end of the guide leg;
a spring encircles a bottom portion of the guide leg, wherein the spring is positioned adjacent to a top surface of the washer;
a bottom portion of the latch rod channel has a larger diameter than a top portion of the latch rod channel, such that the spring fits within the bottom portion of the latch rod channel; and
a step between the bottom portion of the latch rod channel and the top portion of the latch rod defines a stop for a top end of the spring.

* * * * *